July 13, 1954 C. E. SWENSON 2,683,508
ONE-WAY CLUTCH
Filed Aug. 25, 1950
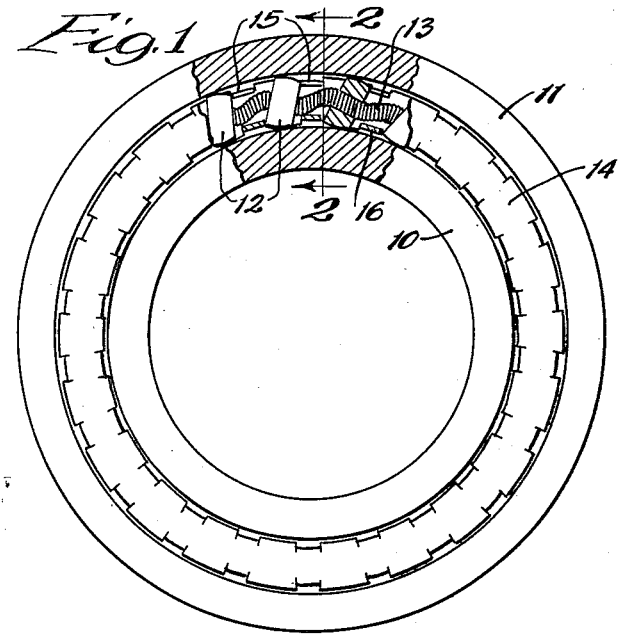
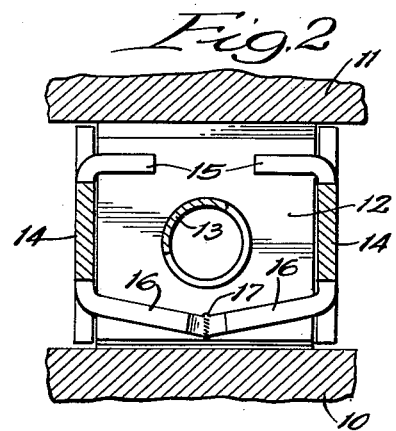
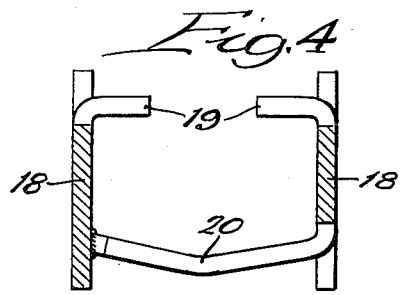
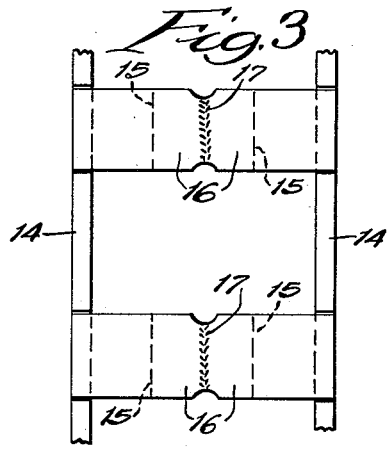
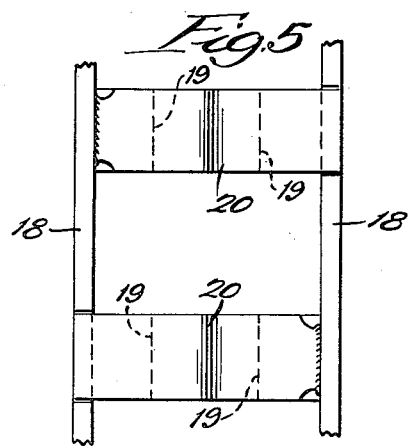
INVENTOR:
Carl E. Swenson,
BY
E. J. Barth,
ATTORNEY.

Patented July 13, 1954

2,683,508

UNITED STATES PATENT OFFICE 2,683,508

ONE-WAY CLUTCH

Carl E. Swenson, Rockford, Ill., assignor to Borg-Warner Corporation, Chicago, Ill., a corporation of Illinois Application August 25, 1950, Serial No. 181,523

3 Claims. (Cl. 192—45.1)

This invention relates to one way clutches and more particularly to a cage construction for tiltable gripper type clutches.

Tiltable gripper clutches preferably employ cages to hold the grippers properly assembled and to assist in controlling the action thereof. Such cages, to be commercially satisfactory, should be compact and light and should be capable of production at low cost.

It is one of the objects of the present invention to provide a cage which is extremely compact and light and which can be manufactured at minimum cost.

Another object is to provide a cage formed entirely of sheet material with a minimum number of operations. According to one feature the cage is formed of two identical stampings assembled by welding.

A further object is to provide a cage in which the grippers and their connecting spring can easily and quickly be assembled and which will protect the spring during handling and use.

The above and other objects and advantages of the invention will be more readily apparent from the following description when read in connection with the accompanying drawing, in which:

Figure 1 is an elevation with parts in section of a clutch embodying the invention;

Figure 2 is an enlarged section on the line 2—2 of Figure 1;

Figure 3 is a partial view of the cage looking from the inside;

Figure 4 is a section through an alternative cage construction, and

Figure 5 is a partial view of the cage of Figure 4 looking from the inside.

The clutch of Figures 1 to 3 is adapted to connect inner and outer coaxial races 10 and 11 for rotation together in one direction. The races have spaced cylindrical surfaces between which are mounted a series of tiltable grippers 12 with their ends curved about spaced centers. Each of the grippers has an opening centrally therethrough and an annular coil spring 13 is threaded through the openings as more particularly described and claimed in my Patent No. 2,386,013.

The grippers are held in properly assembled position by a cage formed of a pair of identical sheet metal stampings. Each stamping includes a flat annular side ring 14 adapted to fit between the races and which is formed at its edges with integral slitted and bent over fingers to project between the grippers. As shown, short outer fingers 15 project inward from the rings with their ends spaced apart a distance slightly greater than the diameter of the spring 13. Longer inner fingers 16 abut in end to end relationship and are secured together by any suitable means such as welding, as indicated at 17.

To form the assembly the side rings may be stamped out and may be placed together and welded in a suitable jig. The grippers may then be inserted between the fingers 15 and 16 with the spring 13 passing through the space between fingers 15 to the assembled position shown.

In the assembly the cage holds the grippers in proper position and substantially completely encloses the spring to protect it. During use, the fingers will engage the grippers at radially spaced points to limit tilting thereof so that the spring will not be bent excessively and the grippers will be held in proper operating position.

Figures 4 and 5 illustrate an alternative cage construction also formed of two identical sheet metal stampings. In this construction each stamping includes a flat annular side ring 18 having short outer fingers 19 slitted and bent over from its outer edge. At its inner edge each ring has a series of long fingers 20 bent therefrom, there being only half as many long fingers as short fingers. The rings are assembled with their long fingers alternating and the long fingers on each ring engaging and welded to the inner face of the other ring. When completed this construction is substantially identical to that of Figures 1 to 3 and functions in the same manner.

While two embodiments of the invention have been shown and described in detail, it will be understood that these are illustrative only and are not definitive of the scope of the invention, reference being had for this purpose to the appended claims.

What is claimed is:

1. A one way clutch comprising a series of tiltable grippers, a cage including a pair of flat annular side rings of sheet material, integral fingers extending from one edge of each side ring partially between adjacent grippers to leave a space between their ends, integral fingers extending from the other edges of the side rings between adjacent grippers and rigidly connecting the side rings, and an annular spring smaller in diameter than the space between the first named fingers threaded through the grippers.

2. A one way clutch comprising a series of tiltable grippers, a cage including a pair of flat annular side rings of sheet material, integral fingers extending from one edge of each side ring partially between adjacent grippers to leave a space between their ends, integral fingers extending from the other edges of the side rings between adjacent grippers and connected together in end to end relationship, and an annular spring smaller in diameter than the space between the first named fingers threaded through the grippers.

3. A one way clutch comprising a series of tiltable grippers, a cage including a pair of flat annular side rings of sheet material, integral fingers extending from one edge of each side ring partially between adjacent grippers to leave a space between their ends, integral fingers extending from the other edges of the side rings between adjacent grippers and extending completely from each side ring to the other, the last named fingers alternating on the respective side rings, and an annular spring of smaller diameter than the space between the first named fingers threaded through the grippers.

References Cited in the file of this patent

UNITED STATES PATENTS

| Number | Name | Date |
|---|---|---|
| 1,147,497 | Freed | July 20, 1915 |
| 1,940,124 | Gibbons | Dec. 19, 1933 |
| 2,016,923 | Herrmann | Oct. 8, 1935 |
| 2,113,722 | Dodge | Apr. 12, 1938 |
| 2,386,013 | Swenson | Oct. 2, 1945 |